(12) United States Patent
Krenz et al.

(10) Patent No.: US 7,696,955 B1
(45) Date of Patent: Apr. 13, 2010

(54) MAGNIFIED DISPLAY OF HEAD DOWN INFORMATION AT OPTICAL INFINITY

(75) Inventors: Michael J. Krenz, Cedar Rapids, IA (US); Sarah Barber, Robins, IA (US); Kirschen A. Seah, Robins, IA (US); Maureen A. Lehman, Cedar Rapids, IA (US); Pamela K. Hahn, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1092 days.

(21) Appl. No.: 11/357,327

(22) Filed: Feb. 17, 2006

(51) Int. Cl.
*G09G 5/00* (2006.01)
(52) U.S. Cl. .......................... 345/7; 359/630
(58) Field of Classification Search ................ 345/7–9; 340/901; 359/630
See application file for complete search history.

(56) References Cited

U.S. PATENT DOCUMENTS

| 5,959,605 | A | | 9/1999 | Gilblom |
| 5,995,290 | A | * | 11/1999 | Noble .......................... 359/630 |
| 6,927,782 | B2 | | 8/2005 | Coldefy |

* cited by examiner

*Primary Examiner*—Srilakshmi K Kumar
(74) *Attorney, Agent, or Firm*—Matthew J. Evans; Daniel M. Barbieri

(57) ABSTRACT

An information magnification system for providing enhanced display information for a display system for a vehicle. The display system is of a type that includes a first display and a second display. The information magnification system includes a user interface for providing the capability for a user to select a magnification zone of interest on the first display of the vehicle. An information magnification electronics subsystem is associated with the user interface and with the first and second displays to enable the selected magnification zone to be presented on the second display appearing to be behind the physical surface of the second display at a selected distance, thus providing the capability for the user to maintain a far field of focus.

15 Claims, 3 Drawing Sheets

MAGNIFIED DISPLAY OF HEAD DOWN INFORMATION AT OPTICAL INFINITY

BACKGROUND OF THE INVENTION

1. Field of the Invention

The present invention relates generally to electronic instrumentation such as flight control instrumentation, and more particularly to displays providing improved presentation of desired information.

2. Description of the Related Art

Effective flight management of aircraft is closely related to providing accurate and timely information to the pilot. This should be done in a manner that succinctly but accurately conveys to the pilot information important to the safe operation of the aircraft.

A principal flight instrumentation display is the Primary Flight Display (PFD) which shows information about course, speed, altitude, rate of climb and other information. The PFD is usually an electronic display such as a cathode ray tube or back-lit liquid crystal display.

Because of the already crowded and busy nature of the PFD screen, it is difficult to add new information in a manner that can be easily and quickly grasped by the pilot. In general, the new information almost always has to be placed in an already defined field on the display. However, it cannot replace unrelated essential information. For example, more detailed navigation information cannot be placed in the display area reserved for a different category of information such as speed, altitude, heading, etc.

Various devices for magnifying video are proposed in the prior art. For example, U.S. Pat. No. 5,959,605, issued to D. L. Gilblom, entitled "Video Magnifier" discloses a method and device for selectively displaying a magnified image which permits an operator to appreciate the magnified image in its original context. The device includes a main monitor, a magnifier monitor, associated memories, and a controller. The magnifier monitor is movably mounted with respect to the main monitor. The position of the magnifier monitor in two dimensions represents the approximate center of a region on the main monitor to be magnified. The magnifier monitor is movable in a third dimension, and the position of the magnifier in the third dimension is used to determine the degree of magnification desired.

U.S. Pat. No. 6,927,782, issued to P. Coldefy, et al., entitled "Airport Display Device" discloses a display device that comprises display means including a screen, a data base provided with data on the airport, an actuating system for selecting a degree of zoom, a central unit that controls the display means such that it shows the airport on the screen according to a scale value representative of a selected degree of zoom, and a means making it possible to parameterize scale values. The display means shows the airport solely in plan view on the screen, and the central unit controls it such that it shows on the screen details, according to one of a plurality of different levels of detail, each of the levels of detail being dependent on the selected degree of zoom These and other prior art references do not address the problem related to the crowded nature of the primary flight displays in aircraft.

SUMMARY OF THE INVENTION

In a broad aspect, the present invention is an information magnification system for providing enhanced display information for a display system for a vehicle. The display system is of a type that includes a first display and a second display. The information magnification system includes a user interface for providing the capability for a user to select a magnification zone of interest on the first display of the vehicle. An information magnification electronics subsystem is associated with the user interface and with the first and second displays to enable the selected magnification zone to be presented on the second display appearing to be behind the physical surface of the second display at a selected distance, thus providing the capability for the user to maintain a far field of focus. The second display is preferably focused at approximately optical infinity.

Two problems are solved by the present invention when implemented on aircraft. First, display systems are often packed with data and information. It is advantageous to be able to isolate and zoom in on information of interest. Second, display systems in compact areas such as vehicular cockpits or control rooms, often provide a challenge for those who are farsighted.

DETAILED DESCRIPTION OF THE INVENTION

Figure 1:
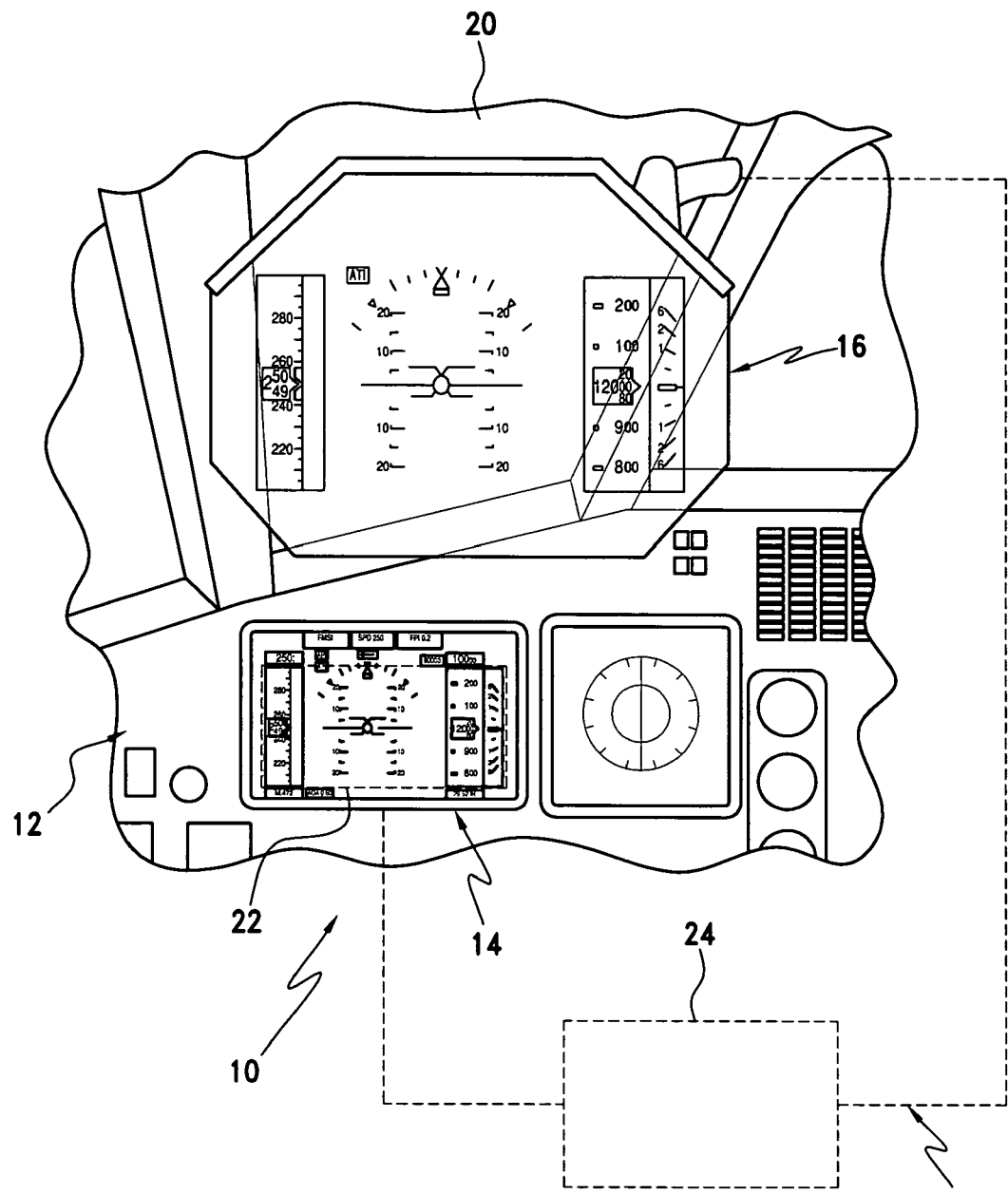
FIG. 1 is a schematic representation of the information magnification system of the present invention.

Referring now to the drawings and the characters of reference marked thereon, FIG. 1 illustrates a preferred embodiment of the display system for a vehicle, of the present invention, designated generally as 10. In this preferred embodiment the display system is shown relative to an aircraft cockpit, designated generally as 12. The display system includes a head down display 14, a head up display 16, and an information magnification system, designated generally as 18. The head up display 16 is operatively associated with the windshield 20 of the aircraft and is typically focused at optical infinity as is well known in the field of head up displays for aircraft.

The information magnification system 18 includes a user interface, e.g. cursor 22, for providing the capability for a user to select a magnification zone of interest on the head down display 14 of the vehicle. In this embodiment a rectangular cursor has been illustrated. However, other types of cursors may be utilized and other types of user interfaces. Alternative user interfaces may include, for example, a series of defined/mapped areas on a touchpad.

An information magnification electronics subsystem 24 is associated with the user interface 22, with the head up display 16 and head down display 14 to enable the selected magnification zone 22 to be presented on the head up display 16 while commensurately providing the capability for the user to provide a far field of focus. The information magnification electronics subsystem 24 may include electronics for processing information, converting information to graphical representations, and interfacing with other systems on the aircraft.

Information that may be provided on a head down display for an aircraft may include, for example, attitude, altitude, airspeed, and deviation data during final approach. It may include departure, arrival, or approach chart information. Other information may include taxi diagrams, or, for example, engine parameters approaching exceedance limits.

Figure 2:
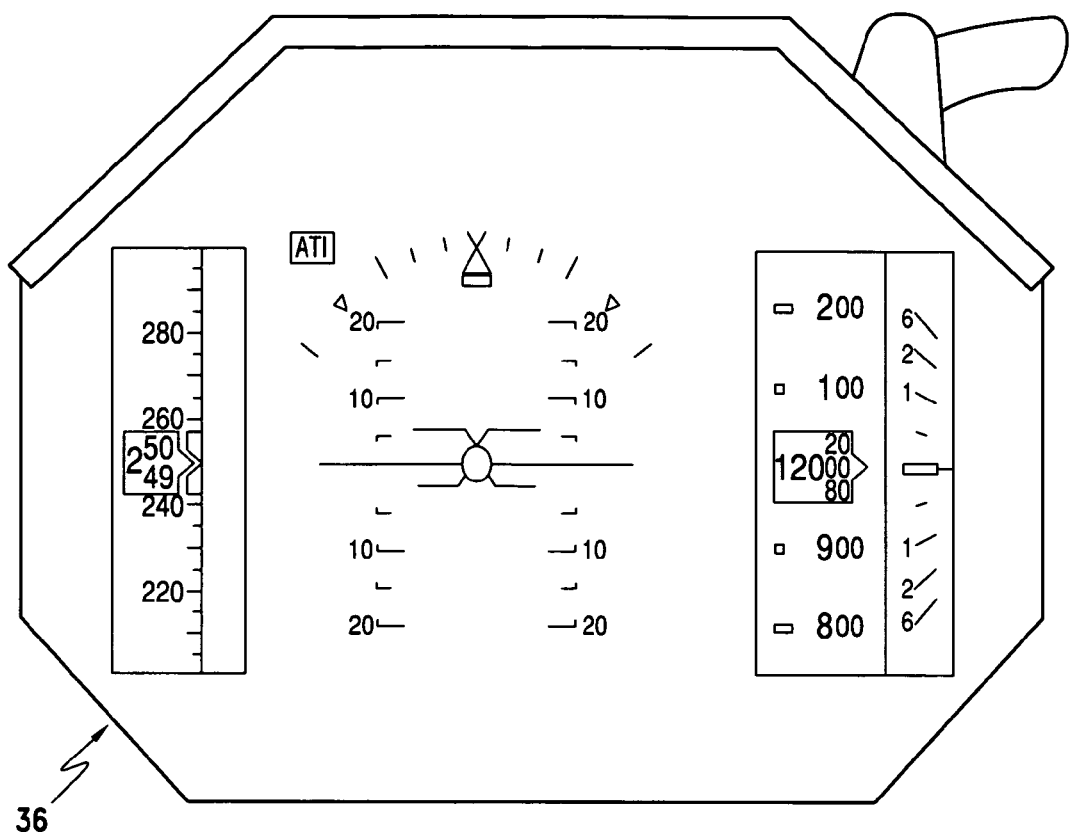
FIG. 2 shows a head down display and a head up display side by side to illustrate the methodology of choosing a magnification zone of interest.
Figure 2:
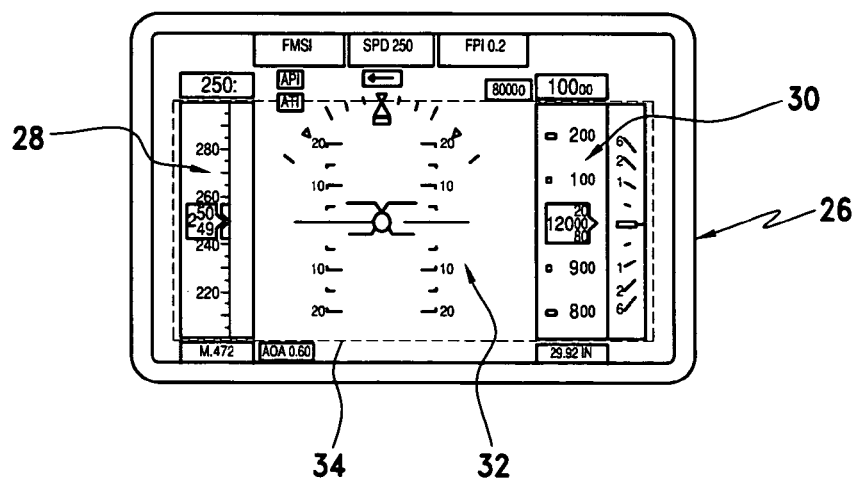

Referring now to FIG. 2, an example of a (head down) primary flight display (PFD) is illustrated, designated generally as 26. A typical PFD may display a variety of information. For example, the PFD illustrated in this figure contains an airspeed tape 28, an altitude tape 30, and a sky/ground ball 32. In operation of the present invention, the pilot selects a magnification zone, denoted by the rectangular dashed cursor 34. Preferably, this magnification zone can be stretched, shrunk, or moved around as desired. Although only one magnification zone is shown, there may be multiple magnification zones. Once the magnification zone 34 is selected it is then scaled appropriately and displayed on the head up display, designated generally as 36. The head up, or magnified, display 36 should be placed appropriately for the application, and the location will vary significantly based upon application. For instance, it may be appropriate for the head up display to be placed on the top of the glare shield near the center of a cockpit based system.

Thus, the present invention enables the user to isolate and zoom in on information while at the same time maintaining a far field of focus. The information within the selected magnification zone is projected on the head up display and appears to be behind the physical surface of the second display at a selected distance, typically focused at optical infinity, near the primary field of view. Although the figures appear to show a conformal display, i.e. the magnified image "lays substantially on top of" or is "conformal" with the outside world, the present invention is not deemed to be limited to such a conformal display—the magnified image may or may not be conformal with the field of view onto which it projected.

Figure 3:
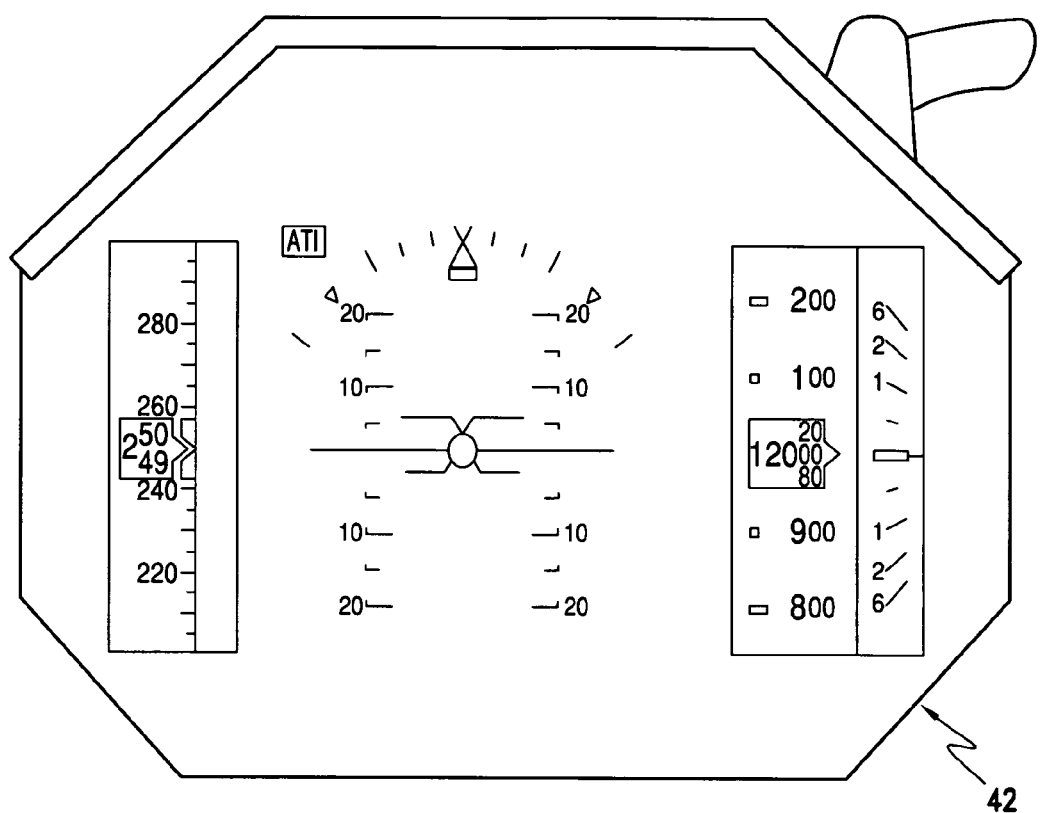
FIG. 3 shows a head down display and a head up display side by side using an alternate cursor to illustrate an optional methodology of choosing a magnification zone of interest.
Figure 3:
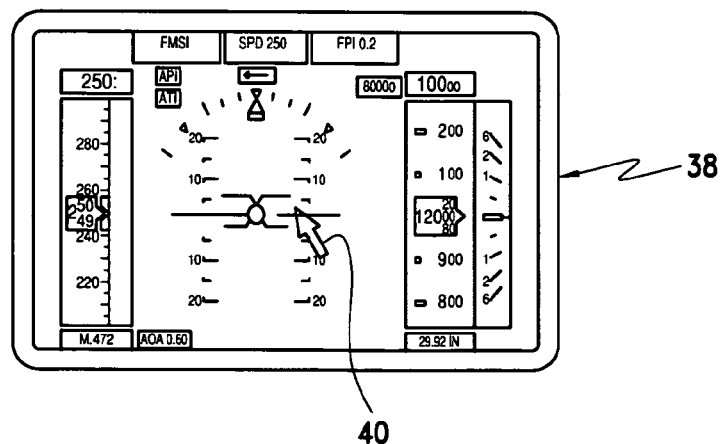

Referring now to FIG. 3, a display 38 illustrates the use of an alternative type of cursor, i.e. arrow 40. In such an instance the display 38 would utilize a defined zoom factor for presentation on the head up display 42.

Although FIGS. 2 and 3 illustrate two different types of user interfaces the user interface can be provided in a variety of ways including, for example, moving a box with a cursor or block movement keys, drawing a box, or simply selecting the entire display. Whatever information is selected is then scaled appropriately and displayed on the head up display.

Although the present invention has been described with reference to an aircraft display it can be equally utilized on other display systems that use a head up display. For example, it can be used on various types of aerospace vehicles, ground vehicles, and water vehicles. It may be particularly useful with the display systems utilized by modern cranes.

The head up display may be, for example, any number of existing units with the capability to present pixel information focused at 20 feet or greater from the user. The unique capability of the head up display to keep the image focused at substantially optical infinity is a key benefit when the user is referencing information at optical infinity in conjunction with directly perceived information in the real world.

Other embodiments and configurations may be devised without departing from the spirit of the invention and the scope of the appended claims.

The invention claimed is:

1. An information magnification system for providing enhanced display information for a display system for a vehicle, said display system including a first display and a second display, said information magnification system comprising:
   (a) a user interface for providing the capability for a user to select a magnification zone of interest on said first display of the vehicle; and
   (b) an information magnification electronics subsystem associated with said user interface and with said first and second displays to enable said selected magnification zone to be concurrently presented on said second display appearing to be behind the physical surface of said second display at a selected distance, thus providing the capability for the user to maintain a far field of focus; and
   wherein said first display comprises a head down display, said second display comprises a head up display, and said vehicle comprises an aircraft.

2. The information magnification system of claim 1, wherein said second display is focused at approximately optical infinity.

3. The information magnification system of claim 1, wherein second display comprises a conformal head up display.

4. The information magnification system of claim 1, wherein second display comprises a non-conformal head up display.

5. The information magnification system of claim 1, wherein said magnification zone is defined by a cursor on said first display.

6. The information magnification system of claim 1, wherein said magnification zone is defined by a rectangular cursor on said first display.

7. A display system for a vehicle, comprising;
   a) a first display containing head down information;
   b) a second display; and,
   wherein said first display comprises a head down display, said second display comprises a head up display, and said vehicle comprises an aircraft; and,
   c) an information magnification system, comprising:
      i) a user interface for providing the capability for a user to select a magnification zone of interest on said first display of the vehicle; and
      ii) an information magnification electronics subsystem associated with said user interface and with said first and second displays to enable said selected magnification zone to be concurrently presented on said second display appearing to be behind the physical surface of said second display at a selected distance, thus providing the capability for the user to maintain a far field of focus.

8. The display system of claim 7, wherein said second display is focused at approximately optical infinity.

9. The display system of claim 7, wherein said second display, comprises a conformal head up display.

10. The display system of claim 7, wherein said second display, comprises a non conformal head up display.

11. The display system of claim 7, wherein said magnification zone is defined by a cursor on said first display.

12. The display system of claim 7, wherein said magnification zone is defined by a rectangular cursor on said first display.

13. A method for display flight information on a vehicle, wherein said vehicle comprises an aircraft, said method comprising the steps of:
   a) utilizing a user interface for defining a magnification zone of interest on a first display of a vehicle, said first display containing head down information, said first display comprises a head down display; and
   b) concurrently displaying information in said magnification zone of interest on a second display appearing to be behind the physical surface of said second display at a selected distance, thus providing the capability for the user to maintain a far field of focus, said second display comprises a head up display.

14. The method of claim 13, wherein said magnification zone is defined by a cursor on said first display.

15. The method of claim 13, wherein said magnification zone is defined by a rectangular cursor on said first display.

* * * * *